Figures 1, 2:
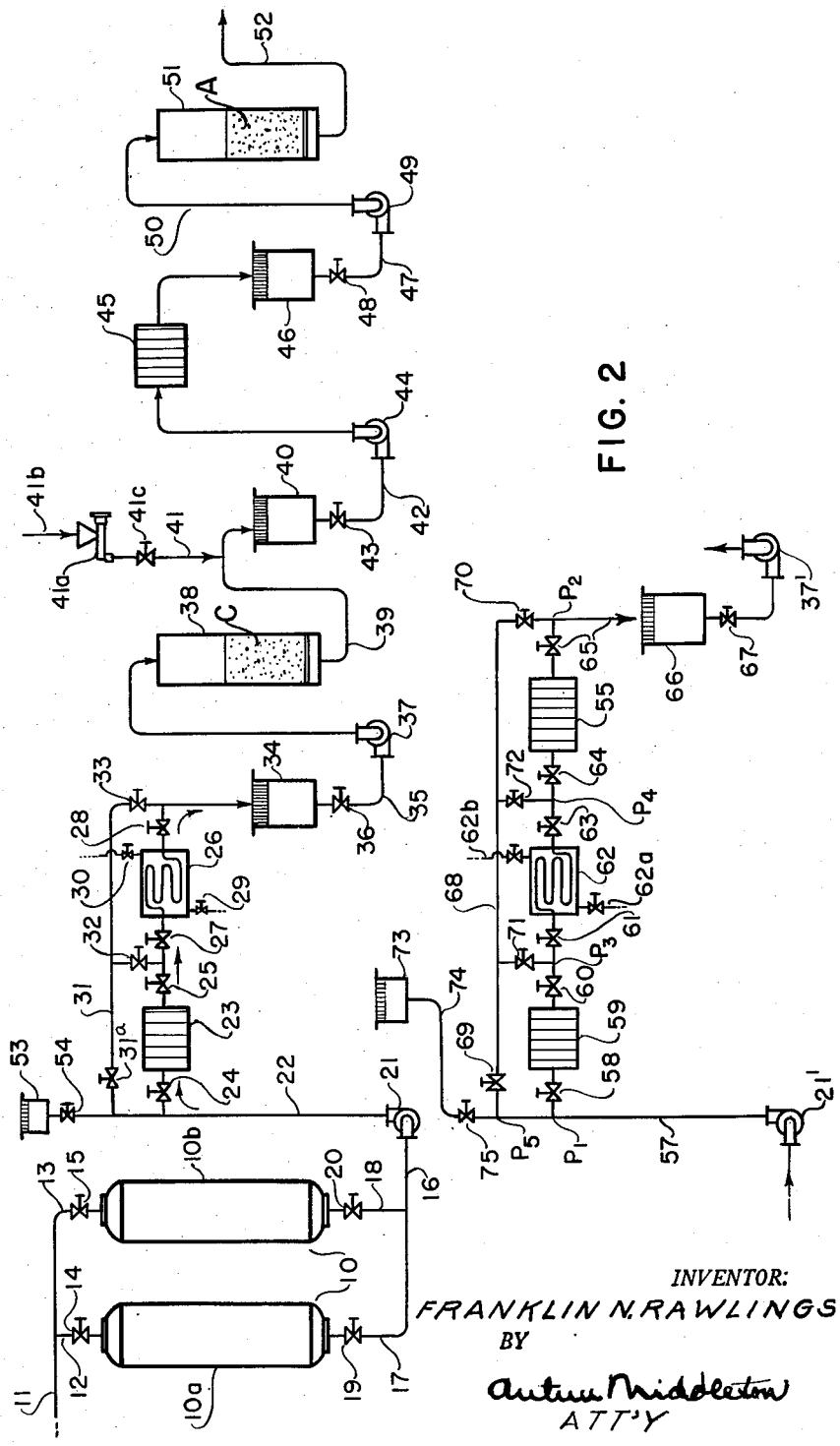

April 11, 1950     F. N. RAWLINGS     2,503,767
PURIFICATION OF SUGAR SOLUTIONS
Filed July 12, 1946

INVENTOR:
FRANKLIN N. RAWLINGS
BY
Arthur Middleton
ATT'Y

Patented Apr. 11, 1950

2,503,767

UNITED STATES PATENT OFFICE 2,503,767

PURIFICATION OF SUGAR SOLUTIONS

Franklin N. Rawlings, Ogden, Utah, assignor to The Dorr Company, New York, N. Y., a corporation of Delaware Application July 12, 1946, Serial No. 683,046

1 Claim. (Cl. 127—46)

This invention relates to the treatment of sugar-bearing liquids for the purpose of removing non-sugars or impurities from them. The presence of non-sugars is undesirable since they inhibit proper and efficient functioning of subsequent treatment steps, interfering with and reducing the efficiency of the crystallization of the sugar, the uncrystallized portion of which is thus lost in the final residue or molasses.

More specifically, this invention relates to the treatment of sugar-bearing liquids obtained from sugar beets and known as beet juice. In its thin raw state the beet juice is known as diffusion juice. After it has undergone certain purification treatment as well as concentration by evaporation it is termed a syrup which may yield sugar crystals as a result of crystallization operations.

The treatment of diffusion juice comprises heating the juice and liming it to a high degree of alkalinity (that is to a pH of about 12.0), subjecting the thus conditioned juice to carbonation, that is contact with $CO_2$ gas, usually in a first and then in a second carbonation stage followed by removal of the precipitates yielding in these stages.

Carbonation of beet juice is conventionally followed by sulfitation treatment (contact with $SO_2$) even though this mode of clarification as a whole may be and is often referred to briefly as carbonation treatment in distinction from non-carbonation methods relying upon clarification of the juice by heating and liming and solids separation alone.

The clarification of beet juice by carbonation treatment removes suspended, precipitable, coagulatable, and non-dissolved matter from the juice. Indeed, the non-sugars thus being removed comprise compounds closely related to pectin and albumin which if left in the juice are the cause of undesirable jelling of the syrups during crystallization operations.

Those non-sugars which are in solution are unaffected by conventional clarification treatment. Such non-sugar solutes are organic as well as inorganic matter, with some ionized and others non-ionized. Colloidal impurities are also left in the juice. All non-sugars thus left in the juice in spite of the conventional clarification treatment cause a proportionate loss of sugar in the molasses.

It has been proposed heretofore to remove these dissolved non-sugars subsequent to carbonation treatment of the beet juice by ion exchange treatment (as described in my co-pending patent application, Ser. No. 376,717 now Patent No. 2,413,844), namely by passing the clarified juice sequentially through a bed of granular cation exchange material and a bed of granular anion exchange material. The chemical mechanism of this ion exchange is known in principle as far as it concerns the abstraction from a solution of inorganic solutes or ionized salts.

That is to say, the cation exchange bed operating in the ion exchange cycle will substitute H-ions for the cations of the ionized salts, thereby forming the corresponding acids in the juice, with the result that under beet juice treatment conditions the acidified juice effluent from the cation exchange bed shows a pH as low as 2.0 or even less.

When this acidified juice is subsequently passed through the anion exchange bed operating in the so-called hydroxyl cycle, the juice becomes neutralized due to the substitution of OH-ions from the exchange material for the anions of the acid. In this way by the combined sequential actions of the exchanger beds the molar equivalent of pure water is substituted for the ionized salts in the solution, although another concept is that the acid molecule in the acidified juice is adsorbed as a whole by the anion exchange material.

Thereafter the juice is subjected to concentration by evaporation, and this is followed by crystallization operation.

The cation and the anion exchange beds become exhausted in due course whereupon the flow of the juice through them is discontinued, so that they may be regenerated with suitable regenerant solutions. That is to say the cation exchange bed is regenerated with an acid solution while the anion exchange bed is regenerated with an alkali solution. After the beds have been properly regenerated and have been washed free of any residual regenerant solution, the flow of juice through them may be resumed.

In this way it has been possible to produce not only a color-free treated juice and consequently a factory-white sugar, but also because of the high degree of juice purity thus attained, to produce a maximum yield in sugar crystals while a minimum of sugar is being lost in the molasses or residue.

In conjunction with such a combined clarification and ion exchange treatment by co-pending patent application—Ser. No. 376,717 now Patent No. 2,413,844—as well as my Patent No. 2,391,843, disclose that the clarified juice is intermediately cooled or cooled and filtered, i. e.

prior to its being passed through the ion exchange treatment station.

With respect to obtaining the above mentioned high purity of beet juice, I have found that a combination of clarification- (carbonation-) treatment with ion exchange treatment gives desired results especially with respect to the removal of the pectins and albumins, although some of the sugar in the juice is chemically changed in the course and as a result of the conventional clarification treatment phase.

Yet, in order to eliminate the expensive operation and apparatus required for carbonation various proposals have been made for treatment methods suggesting the dosing of the juice with a relatively small amount of CaO, while omitting the $CO_2$ treatment so that white crystallized sugar might be produced directly in this way. Such proposed methods have relied mainly upon the addition of a calcium compound under specially or critically controlled conditions to coagulate, flocculate, precipitate, and decompose as much as possible of the non-sugars, as part of the lime goes into solution in the sugar juice and reacts with some of the impurities present therein, combines with any free acid present such as organic acids, and displaces potassium and sodium from the alkali salts of these acids whose lime salts are insoluble. Oxalic and phosphoric acids and their alkali salts are typical of the group of compounds which are removed from solutions by lime. Coagulation of organic impurities and to some extent of albuminous matter is also effected by the heating and liming thereof. This treatment may be said to effect coagulation of a quantity of coagulatable material as well as flocculation of a quantity of suspended material, thus rendering these impurities amenable to separation.

While such non-carbonation methods have relied mainly upon a calcium compound such as lime as the basic dosing reagent in the clarification process, they require that this reagent be administered under a variety of limiting conditions such as rate of dosing, mode of application, and accompanying physical circumstances such as temperature and agitation, one or more or all of which factors may be considered critical for accomplishing the particular clarification result sought.

The amount of lime thus proposed to be added is considerably less than that required where lime is to be reacted with $CO_2$ in carbonation and possibly to be reacted with $SO_2$ in sulfitation. An economical as well as effective liming according to these non-carbonation proposals may be said to correspond to an induced pH of about 10.0 to 11.0; that is to say, with such a pH value there might be obtained an effective removal of coagulatable impurities at a relatively minimum expenditure of CaO, which removal may or may not include the coagulation of colloidal impurities in the juice.

Indeed I have found that where these compounds or substances (albumin and pectin) are not removed by clarification, they will tend to stay in the juice, pass through the ion exchange station as heretofore known, and unless otherwise or specifically removed will interfere with crystallization because of jelling.

One object of this invention is to devise an economical and effective method of purification whereby there is obtained a high purity juice freed of a significant portion of pectins and albumins or compounds closely related thereto, without requiring the conventional carbonation- or non-carbonation clarification-treatment or other costly treatments for the specific removal of pectins. This problem is significant inasmuch as I have found that the ion exchange materials, for example the granular organic resinous materials more recently known as organolites in distinction from the inorganic zeolitic exchange materials, are ineffective in adsorbing or removing the pectins from the juice for which reason they would eventually be found in the syrups and cause the aforementioned jelling difficulties which interfere with the crystallization operation.

In view of this problem of economically clarifying the juice and removing the tenacious pectins I have discovered that the pectins and albumins in question can be encouraged to assume a suitable physical form or flocculent condition by which their separation from the juice is rendered feasible, without requirement of carbonation treatment. I encourage and induce such flocculation while the juice is at a low pH, that is well on the acid side.

According to this invention I take advantage of and utilize the low pH condition of the juice resulting from the cation exchange treatment phase in order to allow and encourage pectins and albumins to flocculate. Thereupon I intercept and separate the flocculated matter from the juice prior to passing the juice to the anion exchange station where the pH is again raised incident to the acid-adsorbing function of that station. I effect the intermediate separation by means of a non-adsorbing and chemically substantially inert filter or filter medium. Within the broad concept of such separation interposed between the cation and the anion exchange stage I also contemplate effecting separation of the thus flocculated matter by the process of settling, or centrifuging, or a combination of these. I also contemplate the use of a suitable flocculation stage prior to separation, as well as the addition of filter aid to the juice in conjunction with the flocculation stage.

More specifically, I propose to effect filtration under the aforementioned conditions at a rapid rate, namely by means of a pressure filter and with the help of a filter aid substance, for example diatomaceous earth, asbestos fiber, etc. Filter aid is added to the juice before, during, or after flocculation, and then together with the flocs it is intercepted upon a resistive bed of material or other detaining medium such as filter cloth, fabric, or wire mesh.

I propose to substantially omit the known or customary kinds of clarification treatment above referred to in the sense that I pass substantially raw diffusion juice, from which physical impurities may have been removed by filtration or solids separation, directly to the ion exchange station. Hence, upon that station I throw the major burden of clarification by inducing low pH flocculation, and then separating the thus flocculated matter among which are pectins and albumins in a station disposed intermediate the cation and the anion exchange stage.

Flocculation is the agglomeration of tiny suspended solids not readily separable from the liquid into clusters or flocs which, in turn, are more readily amenable to separation. Therefore, the rendering of precipitable matter into flocs requires first precipitating or producing preliminary tiny component solids of potential flocs and then rendering these solids into separable flocs.

In the instance and for the purpose of this invention, while precipitation or formation of the preliminary impurity solids tends to occur in the sugar solution, also termed sugar juice, at and because of the low pH of the sugar solution due to the acidifying action of the cation exchange bed, the physical environment in the bed is such as to inhibit the formation of these tiny solids into flocs although not their ability to agglomerate into flocs under conditions favorable for such agglomeration.

Therefore, within the environment of this invention, the removal from the sugar juice of the albuminous and pectinous matter, colloquially herein termed gunk, resolves itself into first precipitating these impurities within the bed into solid phase while flocculation is as yet being discouraged due to the disturbing or adverse effect of the multitudinous and tortuous passages or voids between the granules of the bed; and then after the acidified sugar juice has passed from the bed encouraging the precipitate to flocculate in a relatively unobstructed environment. This latter phase conditions the gunk for separation from the sugar juice prior to the passing of degunked solution to and through an anion exchange bed.

Therefore, this invention comprises first precipitating (but not flocculating) the gunk while the juice is still in transit through the voids and tortuous paths of the cation exchange bed, and thereafter outside of the bed in an unobstructed environment agglomerating the precipitates into separable flocs, and then separating these flocs prior to passing the de-gunked juice to the acid-adsorbing anion exchange bed.

In this way I not only avoid the expense for quantities of lime such as normally required, but I also thereby reduce correspondingly the Ca-removal burden that would be placed upon the cation exchange stage if conventional clarification treatment methods were to be combined with the ion exchange purification phase.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claim. The invention itself, however, both as to its organization and its method of operation, together with additional objects and advantages thereof, will best be understood from the following description of a specific embodiment when read in connection with the accompanying drawings in which Fig. 1 is a flowsheet illustrating the treatment of diffused beet juice according to this invention.

Fig. 2 is a modified portion of the flowsheet.

An important part of the environment of this invention lies in equipment which substantiates the origin as well as the extent of pre-treatment which the juice receives in conjunction with this invention, that is to say it substantiates condition or degree of purity of the sugar solution prior to its being subjected to the improved ion exchange treatment proper according to this invention.

A known concept of sugar juice purification an example of which is presented in my co-pending patent application—Ser. No. 376,717 now Patent No. 2,413,844—provides for a so-called hot clarification or defecation phase in which a reagent or conditioner such as lime or lime in conjunction with $CO_2$ or $SO_2$ is used for removing precipitable matter from the juice. This clarification phase is distinguished from the subsequent ion exchange treatment phase whereby purification of the juice is effected chemically or ionically, that is by abstraction from the juice of impurity solutes. Cooling of the hot clarified juice prior to the ion exchange treatment also has been proposed in said co-pending patent application, Ser. No. 376,717 now Patent No. 2,413,844, in order to discourage inversion of the sucrose when the juice turns temporarily acid due to the H-ion exchange, as well as to lower the juice temperature to a range where it will not adversely affect exchange materials which do not tolerate hot clarification temperatures. In said co-pending application I have also provided for filtration of the cooled juice prior to its entering the ion exchange treatment phase, since I had discovered that the cooling of the juice would unexpectedly cause certain of the impurities in the juice to congeal or become manifest as a filterable substance. While I have not specifically illustrated such intermediate filtering step in conjunction with the cooling stage for the removal of congealed matter, such filtration step may nevertheless be used in conjunction with my present improved method of juice purification.

In the present invention I relieve the clarification phase of some of its conventional burden by imposing such burden or shifting it to or embodying it economically in the ion exchange treatment phase. Thus, while largely dispensing with such conventional clarification steps requiring a substantial amount of lime, liming in conjunction with carbonation, and sulfitation, I do not necessarily exclude solids separating steps, or possibly a degree of dosing the juice with lime, although I have found that the use of appreciable amounts of lime can be largely dispensed with in the practice of my invention.

In the flowsheet of the drawing the origin of the sugar-bearing solution or juice to be treated is indicated by a diffuser battery 10 having conventional diffuser units $10^a$ and $10^b$ in which sugar juice is hot leached from the burden of sliced sugar beets, the so-called cosettes. A water supply header 11 with inlet branches 12 and 13 and respective inlet control valves 14 and 15 supplies the diffuser units. A discharge header 16 supplied by the discharge branches 17 and 18 having respective outlet control valves 19 and 20 carries the diffuser juice to a pump 21 lifting it as through a riser 22 to a separating unit or pressure type filter 23 having an inlet control valve 24 and an outlet control valve 25, to remove suspended matter from the juice. Filtered raw juice then passes through a cooling unit 26 having an inlet control valve 27 and an outlet control valve 28, as well as a valve controlled cooling water inlet 29 and a valve controlled cooling water outlet 30. A pipe connection 31 with valve controlled branches 32 and 33 allows to by-pass either the filter 23 or the cooling unit 26 or both. The pipe connection 31 also has a control valve $31^a$.

The filtered and cooled raw juice passes into a receiver tank 34 having a discharge connection 35 with control valve 36 leading to a pump 37 lifting the juice to a tank 38 and to the top of a bed C of cation exchange material therein. While passing through this bed the juice has its cation exchanged for H-ions and thus acidified it leaves the bed through a discharge connection 39 leading to a receiver tank 40 where the acidulation of the juice to a pH of about 2.0 or less induces and is allowed to produce coagulation and flocculation of the pectins and albumins in the juice. A filter aid material can be added at this point as indicated by the numeral 41, a control supply of filter aid material being indicated by a feeder or conventional feeding device 41$^a$ being supplied with filter aid material as at 41$^b$, and by a valve or control device 41$^c$. A discharge connection 42 having an outlet control valve 43 leads to a pump 44 forcing the acid juice to and through a separating unit or pressure type filter 45 which retains the flocculated matter as well as the filter aid along therewith, the filtrate passing to a receiver tank 46 and through a discharge connection 47 having outlet control valve 48 to a pump 49 lifting the juice substantially freed of pectins and albumins through a riser 50 to an anion exchange tank 51 and to the top of bed A of anion exchange material therein. In passing through this bed the juice becomes neutralized as the acid is being adsorbed by the bed. A purified juice passes from the bottom of the bed as by way of a goose-necked discharge connection 52. Thereupon the juice may be subjected to concentration in evaporators and to subsequent crystallization steps.

An auxiliary supply of lime is indicated by way of a tank 53 provided with control valve 54 for optionally dosing the juice prior to its passage through the filter or separating unit 23.

Fig. 2 shows a portion of the flowsheet of Fig. 1, modified by the addition of a filter 55 in effect positioned between the cooling unit 26 and the receiver tank 34 of Fig. 1.

The flowsheet portion in Fig. 2 is therefore shown to comprise a pump 21' (which corresponds to pump 21 in Fig. 1) and a pump 37' (which corresponds to pump 37 in Fig. 1). A riser 57 leads from the pump 21' to a valved inlet connection 58 of a pressure type filter 59 (similar to filter 23 in Fig. 1) having a valved outlet connection 60 connecting with a valved inlet connection 61 of a cooling unit 62 (which is similar to the unit 26 in Fig. 1). A valved outlet connection 63 from the cooling unit connects with a valved inlet connection 64 leading into the filter 55 which has a valved discharge connection 65 leading to a receiver tank 66 (which is similar to receiver tank 34 in Fig. 1) provided with a valved discharge connection 67 leading to the pump 37'.

A by-pass connection or by-pass header 68 extends from a point $P_1$ of the riser 57 to a point $P_2$ of the discharge connection 65, being provided with a control valve 69 at its initial end and with a control valve 70 at its terminal end. The by-pass header 68 has a valved branch connection 71 leading to point $P_3$ between the valved connections 60 and 61, and another valved branch connection 72 leading to a point $P_4$ between the valved connections 63 and 64.

A lime supply tank 73 is shown to have a discharge connection 74 provided with a control valve 75 leading into the by-pass connection 68 at a point $P_5$ between the control valve 69 and the branch point $P_1$. The cooling unit 62 is shown to have a valved cooling water inlet 62$^a$ and a valved water outlet 62$^b$. In this way it is possible to operate the filter 59 in series with the cooling unit 62 or to operate the cooling unit 62 in series with the filter 55, or to operate filter 59 in series with the cooling unit 62 as well as with the filter 55.

While the filter unit indicated at 45 in Fig. 1 has been described above more specifically as a pressure type filter, I also propose the use of a vacuum filter for the purpose of separating the flocculated matter at a point intermediate the cation- and the anion exchange treatment stage.

I claim:

The method of treating impure sugar-bearing liquids in which the non-sugars include dissolved pectinous and albuminous compounds, which comprises establishing and maintaining a bed of acid-regenerated granular cation exchange material and a bed of alkali-regenerated granular anion exchange material, supplying such impure liquid to the cation bed to precipitate such non-sugars in such liquid incident to the low pH engendered therein by the cation exchange, and passing such liquid through the voids between the granules of the bed, removing liquid from the cation bed with its precipitated non-sugars in suspension therein, flocculating precipitates suspended in the liquid into separable form while detained outside of the cation exchange bed, separating such flocculated non-sugars from the liquid, and supplying the latter to the anion bed.

FRANKLIN N. RAWLINGS.

REFERENCES CITED

The following references are of record in the file of this patent:

UNITED STATES PATENTS

| Number | Name | Date |
|---|---|---|
| 2,375,164 | Bennett | May 1, 1945 |
| 2,391,843 | Rawlings | Dec. 25, 1945 |
| 2,402,960 | Gustafson et al. | July 2, 1946 |
| 2,403,177 | Gustafson | July 2, 1946 |

FOREIGN PATENTS

| Number | Country | Date |
|---|---|---|
| 117,410 | Australia | Sept. 2, 1943 |

OTHER REFERENCES

Schmidt et al., "New Steps Forward in Filtration," Facts About Sugar, March 1938, pages 55-59.

Sugar, Sept. 1948, page 50, "Note on Ion Exchange in Sugar Industry."